(12) United States Patent
Ni et al.

(10) Patent No.: US 12,355,472 B2
(45) Date of Patent: Jul. 8, 2025

(54) RF FRONT-END ARCHITECTURE, ANTENNA DEVICE AND COMMUNICATION TERMINAL

(71) Applicant: RADROCK (SHENZHEN) TECHNOLOGY CO., LTD., Guangdong (CN)

(72) Inventors: Jianxing Ni, Guangdong (CN); Zijie Hu, Guangdong (CN); Yuan Cao, Guangdong (CN); Nan Ni, Guangdong (CN)

(73) Assignee: RADROCK (SHENZHEN) TECHNOLOGY CO., LTD., Shenzhen (CN)

( * ) Notice: Subject to any disclaimer, the term of this patent is extended or adjusted under 35 U.S.C. 154(b) by 352 days.

(21) Appl. No.: 17/794,982

(22) PCT Filed: Jul. 7, 2021

(86) PCT No.: PCT/CN2021/104871
§ 371 (c)(1),
(2) Date: Jul. 24, 2022

(87) PCT Pub. No.: WO2022/007821
PCT Pub. Date: Jan. 13, 2022

(65) Prior Publication Data
US 2023/0102723 A1    Mar. 30, 2023

(30) Foreign Application Priority Data
Jul. 10, 2020 (CN) .......................... 202010662164.6

(51) Int. Cl.
*H04B 1/00* (2006.01)
*H04B 1/401* (2015.01)

(52) U.S. Cl.
CPC ........... *H04B 1/0057* (2013.01); *H04B 1/401* (2013.01)

(58) Field of Classification Search
CPC .................... H04B 1/0057–006; H04B 1/401; H04B 7/04; H04B 7/0602–0606; H04B 7/08–082
See application file for complete search history.

(56) References Cited

U.S. PATENT DOCUMENTS

| | | | |
|---|---|---|---|
| 2014/0211890 A1* | 7/2014 | Adnani | H04B 1/06 375/350 |
| 2017/0063404 A1* | 3/2017 | Langer | H04W 72/0453 |

* cited by examiner

*Primary Examiner* — Ronald Eisner

(57) ABSTRACT

Provided are an RF front-end architecture, an antenna device and a communication terminal. The RF front-end architecture comprises a primary RF front-end module and a secondary RF front-end module. The communication terminal optimizes the RF front-end architecture on the internal antenna device, and is able to work in a multi-antenna working mode to realize the receiving and transmission of multiplex RF signals. The architecture is relatively simple in structure, only two RF front-end modules are needed to realize multiplex transmission and multiplex receiving of RF signals, meanwhile, different frequency band signals which need to be accessed can be flexibly controlled and adjusted. Moreover, the low noise amplifiers in the architecture all support the amplification of multi-band frequency signals, which can ensure the realization of 1T4R, 2T4R and other functions in fewer RF front-end modules, ensure the realization of rich function of the architecture, and reduce the area of the architecture.

20 Claims, 4 Drawing Sheets

RF FRONT-END ARCHITECTURE, ANTENNA DEVICE AND COMMUNICATION TERMINAL

The present application claims the benefit of Chinese Patent Application No. 202010662164.6, filed on Jul. 10, 2020, titled "RF front-end architecture, antenna device and communication terminal".

TECHNICAL FIELD

The application relates to the field of communication terminal wireless communication system, in particular to antenna device on communication terminal, and further relates to the RF front-end architecture in antenna device.

BACKGROUND

Mobile communication technology is developing rapidly, as shown in FIG. 1, the communication terminal 1000 realizes wireless communication through the built-in antenna device 100. With the development and application of the fifth generation mobile communication technology (5G), intelligent devices, especially the 5G technology in mobile terminals, are facing new challenges. The realization of the technical advantages of 5G technology, such as faster network transmission speed, larger network capacity and less network delay, all require further optimization of 5G antenna technology. The existing antenna device generally includes a baseband module, an RF transceiver module, an RF front-end architecture and an antenna link module. The baseband module is used to process digital baseband signals, and encode and decode digital baseband signals. The RF transceiver module is used to perform conversion between digital baseband signals and analog RF signals, process the digital baseband signals transmitted from the baseband module into analog RF signals and send them to the RF front-end architecture, or receive the analog RF signals transmitted from the RF front-end architecture, convert them into digital baseband signals and send them to the baseband module. The RF front-end architecture selectively sends analog RF signals to the antenna link module or receives analog RF signals from the antenna link module, so as to realize the amplification, filtering and other processing of the RF analog signals. The antenna link module includes an external antenna to receive or send analog RF signals.

In the application of 5G technology in mobile terminals, MIMO has become a relatively important technology. MIMO is an antenna system that uses multiple antennas at both transmitter and receiver to greatly improve channel capacity, and forms multiple channels between transmitter and receiver. In the 5G communication of mobile terminals, it is necessary to realize 1T4R, 2T4R, etc. for data transmission in many frequency bands. And in order to support the realization of 1T4R, 2T4R, etc., the corresponding transmitting and/or receiving links need to be added, which increases the complexity of circuit design and inevitably increases the area of the RF front-end architecture, thus it is necessary to further simplify it.

SUMMARY

In order to solve the problems that the architecture formed by RF front-end modules in the prior art needs to add corresponding transmitting and/or receiving links, but the complexity of circuit design is increased and the area of RF front-end architecture is increased, this application provides an RF front-end architecture, an antenna device and a communication terminal.

In one aspect, the application provides an RF front-end architecture, including a primary RF front-end module and a secondary RF front-end module;

the primary RF front-end module includes a primary antenna switch selection module and at least two primary signal transceiver links; the at least two primary signal transceiver links are connected with the primary antenna switch selection module;

each primary signal transceiver link includes an RF power amplifier module, an RF transceiver switch and a multi-band primary filter arranged in sequence;

the RF power amplifier module includes a primary low noise amplifier and a power amplifier; the power amplifier and the primary low noise amplifier are connected to the RF transceiver switch; the primary low noise amplifier is used for receiving RF signal transmitted from the RF transceiver switch, amplifying it and outputting it to the RF transceiver module, and the primary low noise amplifier supports amplification of multi-band signals; the power amplifier is used for receiving RF signal transmitted from the RF transceiver module, amplifying it and outputting it to the RF transceiver switch;

the RF transceiver switch is arranged between the RF power amplifier module and the multi-band primary filter, and used for switching connection between the multi-band primary filter and the primary low noise amplifier or the power amplifier, so as to selectively connect the multi-band primary filter to the primary low noise amplifier or the power amplifier;

the multi-band primary filter is arranged between the primary antenna switch selection module and the RF transceiver switch, and used for filtering the RF signal amplified by the power amplifier and transmitting it to the primary antenna switch selection module, or filtering the RF signal received from the primary antenna switch selection module and transmitting it to the primary low noise amplifier;

the primary antenna switch selection module is used for connecting and gating the two primary signal transceiver links and a primary antenna, or connecting the secondary RF front-end module;

the secondary RF front-end module includes a secondary antenna switch selection module and at least two secondary signal receive links;

each secondary signal receive link includes a secondary low noise amplifier and a multi-band secondary filter; and the secondary antenna switch selection module is used for connecting and gating a secondary antenna or a primary RF front-end module, and is used for receiving RF signal of the primary antenna or the secondary antenna, or transmitting the RF signal received by the secondary antenna to the primary RF front-end module; the multi-band secondary filter is used for filtering the RF signal received by the secondary antenna switch selection module and then transmitting it to the secondary low noise amplifier; the secondary low noise amplifier is used for receiving the RF signal transmitted from the multi-band secondary filter, amplifying it and outputting it to the RF transceiver module, and the secondary low noise amplifier supports amplification of multi-band signals.

In another aspect, the present application provides an antenna device, including a baseband module, an RF transceiver module, a RF front-end architecture and an antenna link module. And the RF front-end architecture is the above-described RF front-end architecture.

In yet another aspect, the present application provides a communication terminal, including the above-described antenna device.

The communication terminal provided by the present application optimizes the RF front-end architecture on the internal antenna device by arranging the primary RF front-end module and the secondary RF front-end module. In the primary RF front-end module, it can work in a multi-antenna mode through the two primary signal transceiver links and the primary antenna switch selection module. It can receive or transmit RF signals through the RF transceiver switch, and select to gate the relevant ports through the antenna switch selection module, so as to gate and connect the primary antenna link, and to gate and connect the secondary antenna link through the secondary RF front-end module, thus realizing the selection of multiple antenna links, and the RF signal of each antenna link is selectable. Meanwhile, the secondary antenna link is gated and connected through the two secondary signal receive links in the secondary RF front-end module and the secondary antenna switch selection module, the primary antenna link is gated and connected through the primary RF front-end module, thus realizing the reception of multiple RF signals. The RF front-end architecture of this application is relatively simple in structure, only two RF front-end modules are needed to realize multiplex transmission and multiplex receiving of RF signals, and meanwhile, different frequency band signals which need to be accessed can be flexibly controlled and adjusted. Moreover, the low noise amplifiers in the RF front-end architecture all support the amplification of multi-band frequency signals, which can ensure the realization of 1T4R, 2T4R and other functions in fewer RF front-end modules, ensure the realization of rich function of the RF front-end architecture, and reduce the area of the RF front-end architecture.

Figure 1:
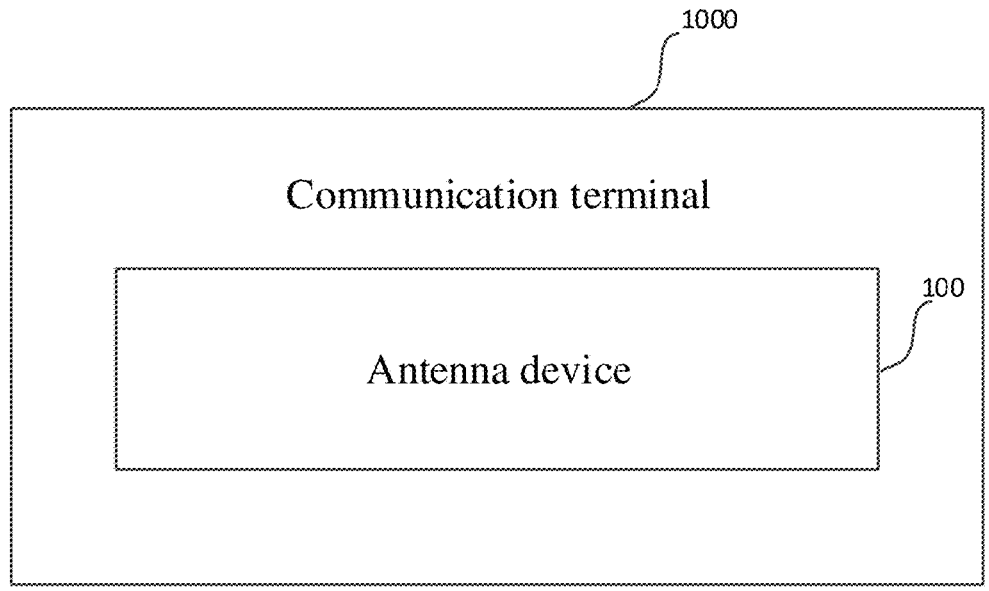
FIG. 1 is a schematic diagram of an antenna device built in a communication terminal.

The reference signs in drawing are as follows:
1000. Communication terminal; 100. Antenna device;
1. Primary RF front-end module; 2. Secondary RF front-end module; 3. Antenna link module; 4. Baseband module; 5. RF transceiver module;
11. RF power amplifier module; 12. RF transceiver switch; 13. Primary antenna switch selection module; 14. Multi-band primary filter;
11a. First RF power amplifier module; 11b. Second RF power amplifier module; 12a. First RF transceiver switch; 12b. Second RF transceiver switch; 14a. First primary filter; 14b. Second primary filter;
111. Primary low noise amplifier; 112. Power amplifier; 113. Matching network;
111a. First low noise amplifier; 111b. Second low noise amplifier; 112a. First power amplifier; 112b. Second power amplifier; 113a. First matching network; 113b. Second matching network;
21. Secondary low noise amplifier; 22. Multi-band secondary filter; 23. Secondary antenna switch selection module; 24. Port selection module;
211. Third low noise amplifier; 212. Fourth low noise amplifier; 221. First secondary filter; 222. Second secondary filter;
31. First primary antenna; 32. Second primary antenna; 33. First secondary antenna; 34. Second secondary antenna;
311. First external duplexer; 321. Second external duplexer; 331. Third external duplexer; 341. Fourth external duplexer; RX1. First receive port; RX2. Second receive port; RX3. Third receive port; RX4. Fourth receive port; TX1. First transmit port; TX2. Second transmit port;
T11. First primary antenna port; T12. Second primary antenna port; T13. Third primary antenna port; T14. Fourth primary antenna port; T15. Fifth primary antenna port; RT11. First primary transceiver port; RT12. Second primary transceiver port; AUX1. First peripheral port; AUX2. Second peripheral port; AUX3. Third peripheral port;
T21. First secondary antenna port; T22. Second secondary antenna port; T23. Third secondary antenna port; R21. First secondary receive port; R22. Second secondary receive port; RT21. First secondary transceiver port; RT22. Second secondary transceiver port.

DETAILED DESCRIPTION OF DISCLOSED EMBODIMENTS

In order to make the technical problems, technical solutions and beneficial effects of the present application more clear, the application will be further explained in detail below with reference to the drawings and embodiments. It should be understood that the specific embodiments described here are only used to illustrate the application, rather than to limit the application.

In the description of the present application, it is to be understood that the terms "longitudinal", "radial", "length", "width", "thickness", "upper", "lower", "front", "rear", "left", "right", "vertical", "horizontal", "top", "bottom", "inner", "outer", and the like indicate an orientation or positional relationship based on that shown in the drawings, and are for convenience of description and simplicity of description only, not intended to indicate or imply that the indicated devices or elements must have a particular orientation, be constructed and operated in a particular orientation, and are therefore not to be construed as limiting the present application. In the description of the present application, unless otherwise stated, "multiple" means two or more.

In the description of the present application, it should be noted that unless otherwise specified and defined, the terms "installation", "connected with" and "connected to" should be understood in a broad sense. For example, they may be fixedly connected, detachably connected or integrally connected, or may be mechanically connected or electrically connected, or may be directly connected or indirectly connected through an intermediate medium. Or it may be internal communication of two elements. For those of ordinary skill in the art, the specific meanings of the above terms in the present application may be understood in specific situations.

Embodiments

This embodiment will specifically illustrate the communication terminal 1000, antenna device 100 and RF front-end architecture disclosed in the present application.

As shown in FIG. 1, the communication terminal 1000 provided by this embodiment realizes wireless communication through the built-in antenna device 100. The antenna device 100 can transmit and receive RF signals of relevant frequency bands through its internal modules. Obviously, the communication terminal 1000 includes not only the antenna device 100, but also other modules, such as processor, user interface and memory. The communication terminal is, for example, personal digital assistants (PDAs), mobile phone, plug-in card in notebook computer, wireless tablet computer, etc.

Figure 2:
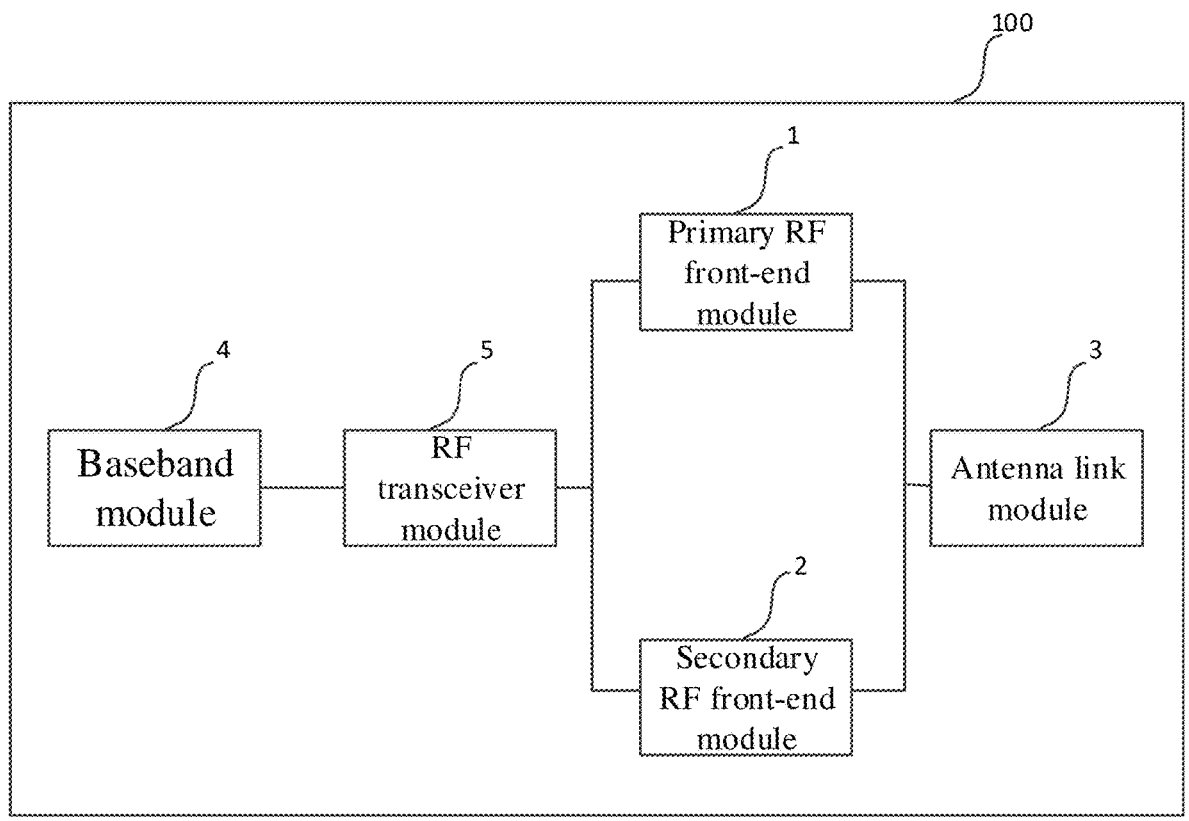
FIG. 2 is a schematic diagram of an antenna device provided by a specific embodiment of the present application.

As shown in FIG. 2, the antenna device 100 in this embodiment also includes a baseband module 4, an RF transceiver module 5, an RF front-end architecture and an antenna link module 3. The baseband module 4 is used to process digital baseband signals, and encode and decode digital baseband signals. The RF transceiver module 5 is used to perform conversion between digital baseband signals and analog RF signals, process the digital baseband signals transmitted from the baseband module 4 into analog RF signals and send them to the RF front-end architecture, or receive the analog RF signals transmitted from the RF front-end architecture, convert them into digital baseband signals and send them to the baseband module 4. The RF front-end architecture selectively sends analog RF signals to the antenna link module 3 or receives analog RF signals from the antenna link module 3, so as to realize the amplification, filtering and other processing of the RF analog signals. The antenna link module 3 includes an external antenna to receive or send analog RF signals. The above modules are known to the public. In the present application, the core difference lies in the optimization and improvement solution of the primary RF front-end module 1 and secondary RF front-end module 2 in the RF front-end architecture.

As shown in FIG. 2, the RF front-end architecture includes a primary RF front-end module 1 and a secondary RF front-end module 2.

Figure 3:
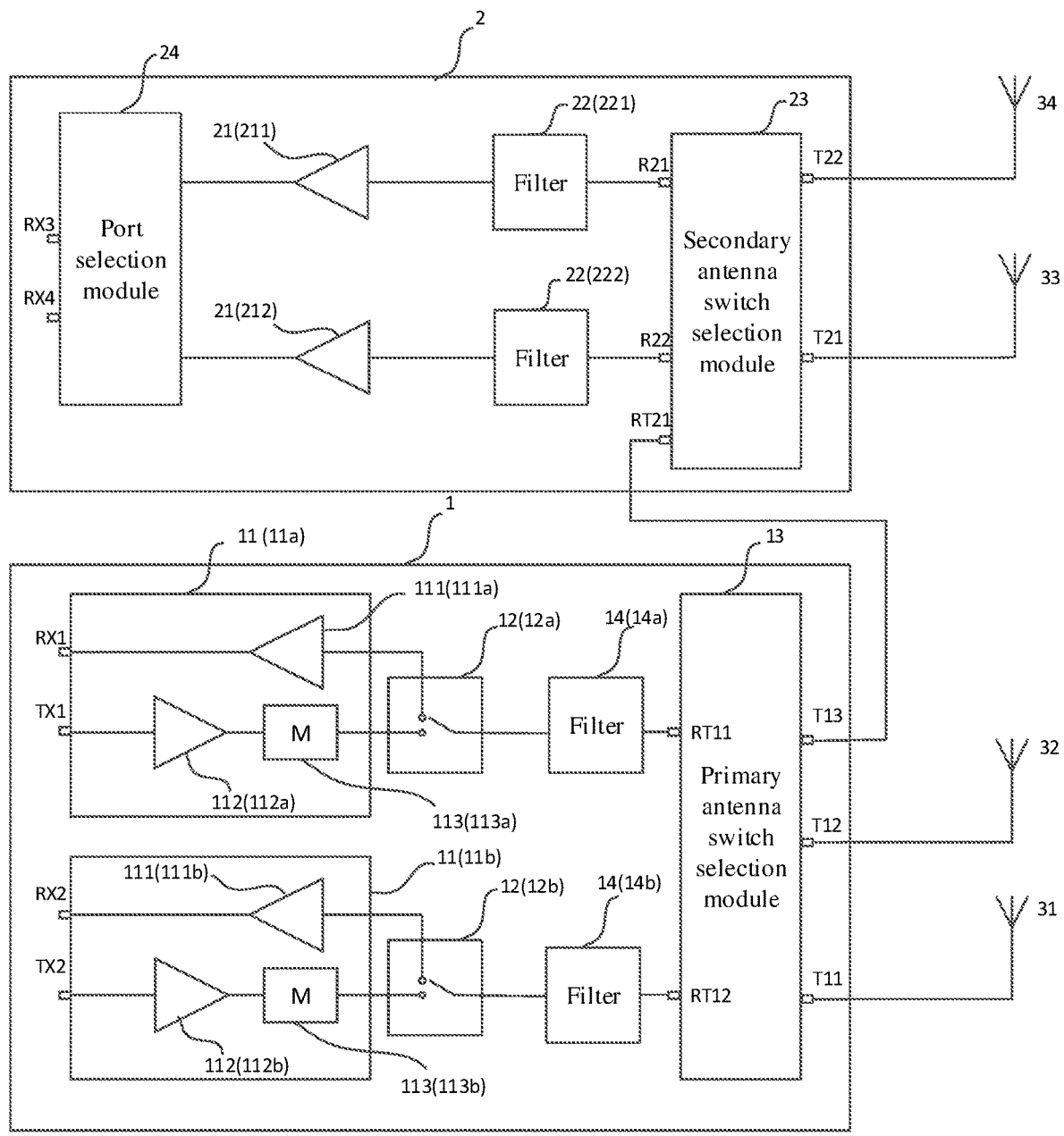
FIG. 3 is a schematic diagram of an RF front-end architecture connecting an antenna provided by a specific embodiment of the present application.
Figure 4:
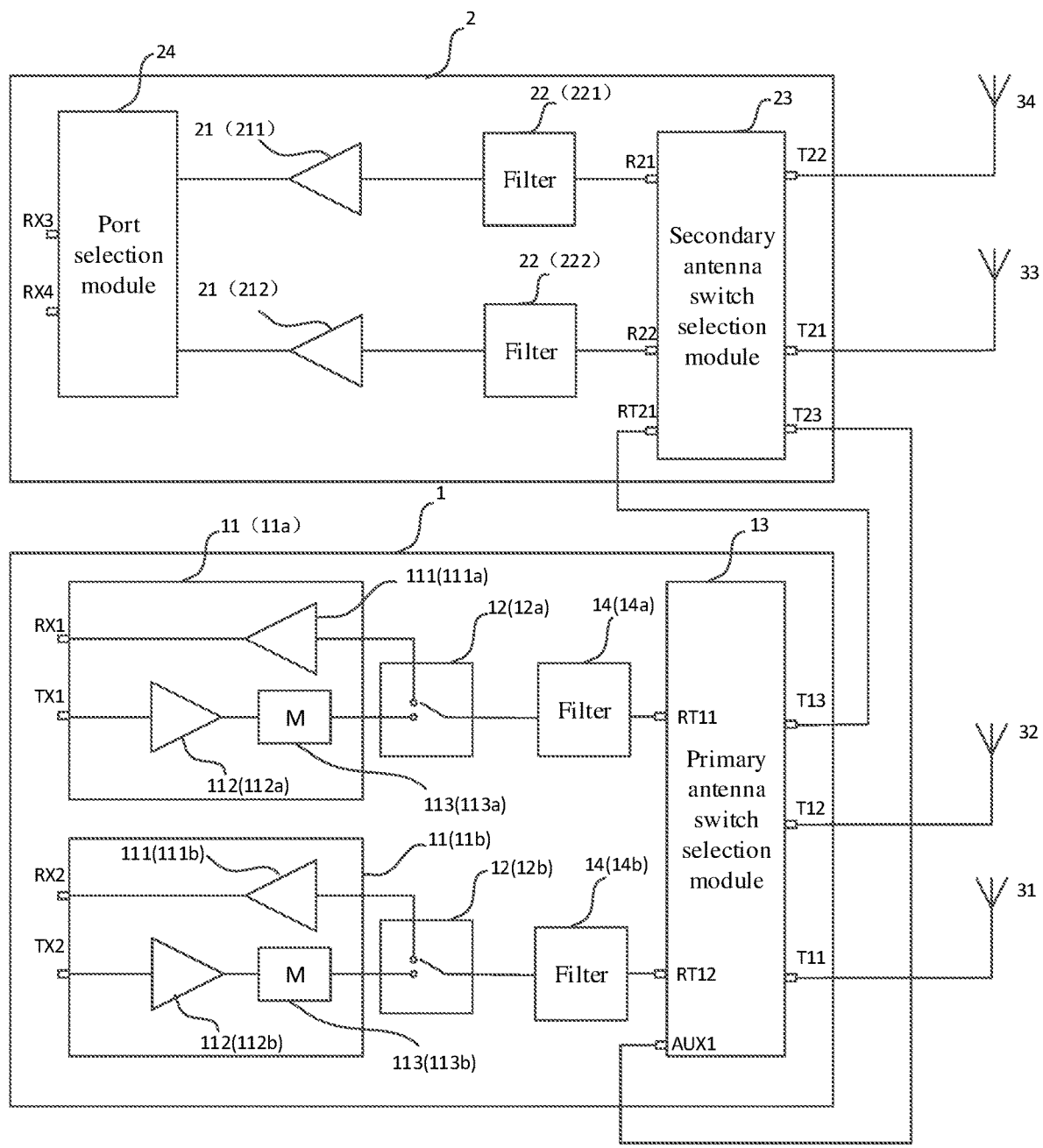
FIG. 4 is a schematic diagram of a further preferred RF front-end architecture connecting an antenna provided by a specific embodiment of the present application.
Figure 5:
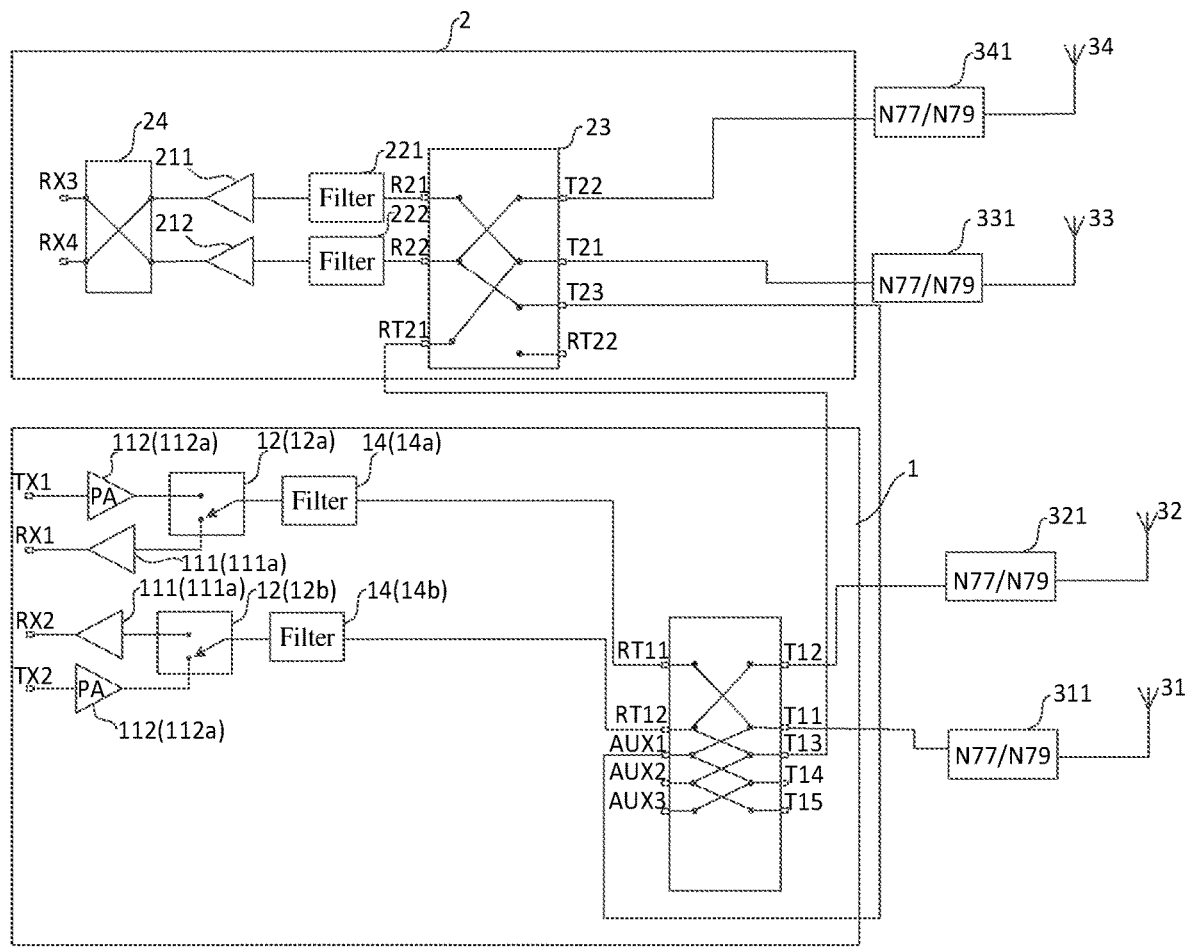
FIG. 5 is a schematic diagram of a further refined RF front-end architecture connecting an antenna provided by a specific embodiment of the present application.

As shown in FIGS. 3-5, the primary RF front-end module 1 includes two primary signal transceiver links and a primary antenna switch selection module 13. The two primary signal transceiver links are both connected to the primary antenna switch selection module 13 (however, it is not limited to only two primary signal transceiver links, there may be more primary signal transceiver links).

Each primary signal transceiver link includes an RF power amplifier module 11, an RF transceiver switch 12, and a multi-band primary filter 14 arranged in sequence. The multi-band primary filter 14 may be used to support filtering of multiple frequency bands, i.e., broadband bandpass filter. For example, in the technical field of 5G antenna, N77 and N79 frequency bands are supported. As is known to all, the N77 frequency band is 3.3-4.2 GHz, and the N79 frequency band is 4.4G-5.0 GHz. That is, the multi-band primary filter 14 is a band-pass filter with a bandwidth of 3.3 GHz to 5.0 GHz.

As shown in FIG. 3, the RF power amplifier module 11 includes a primary low noise amplifier 111 and a power amplifier 112; the power amplifier 112 and the primary low noise amplifier 111 are connected to the RF transceiver switch 12; the primary low noise amplifier 111 is used to receive the RF signal transmitted from the RF transceiver switch 12, amplify it and output it to the RF transceiver module 5, and the primary low noise amplifier 111 supports the amplification of multi-band signals; the power amplifier 112 is used to receive RF signal transmitted from the RF transceiver module 5, amplify it and output it to the RF transceiver switch 12. In the implementation of the RF power amplifier module 11, the RF power amplifier module 11 in each signal transceiver circuit can be packaged into a separate chip, or the primary low noise amplifier 111 in the two RF power amplifier modules 11 are integrated into a separate chip, the power amplifier 112 in the two RF power amplifier modules 11 are integrated into a separate chip. Also, the two RF power amplifier modules 11 may be integrated into one chip. The above are all feasible.

As the power of RF signal output by RF transceiver module 5 is very low, it needs a series of amplification to obtain enough RF power before it can be fed to the antenna and radiated. In order to obtain a large enough RF output power, the power amplifier 112 must be adopted. The power amplifier 112 is also known to those skilled in the art and will not be described in detail.

The RF transceiver switch 12 is arranged between the RF power amplifier module 11 and the multi-band primary filter 14, and used for switching connection between the multi-band primary filter 14 and the primary low noise amplifier 111 or the power amplifier 112, so as to selectively connect the multi-band primary filter 14 to the primary low noise amplifier 111 or the power amplifier 112;

The main function of RF transceiver switch 12 (generally referred to as T/R switch) is to control the switching of the receiving and transmitting states of the whole primary RF front-end module 1, and it is the key module of the primary RF front-end module 1. There are many manufacturing processes of conventional RF transceiver switch 12. At present, most common products in the market adopt III-V process or discrete devices such as PIN diode. This kind of switch has the advantages of low power consumption and good isolation. The disadvantages are high cost, high power consumption and large occupied area. Optionally, the RF transceiver switch 12 is implemented via an SOI (Silicon-On-Insulator) process. With the continuous development of technology, CMOS technology has outstanding advantages such as high integration, low cost and low power consumption, which makes it an optional solution to implement RF transceiver switch 12 by CMOS technology. As is well known to those skilled in the art.

The power amplifier 112 in the RF power amplifier module 11 is used to receive RF signal transmitted from the RF transceiver module 5, amplify it and output it to the matching network 113, and the matching network 113 is used to perform impedance matching on the amplified RF signal and output it to the RF transceiver switch 12.

The multi-band primary filter 14 is arranged between the primary antenna switch selection module 13 and the RF transceiver switch 12, used to filter the RF signal amplified by the power amplifier 112 and transmit it to the primary antenna switch selection module 13, or filter the RF signal received from the primary antenna switch selection module 13 and transmit it to the primary low noise amplifier 111.

As shown in FIG. 3, for brevity, the antenna link module 3 is introduced here first. The antenna link module 3 includes a primary antenna link and a secondary antenna link. In this embodiment, the primary antenna link includes a first primary antenna 31 and a second primary antenna 32; the secondary antenna link includes a first secondary antenna 33 and a second secondary antenna 34.

The primary antenna switch selection module 13 is used for connecting and gating the two primary signal transceiver links and a primary antenna, or connecting the secondary RF front-end module 2;

the secondary RF front-end module 2 includes a secondary antenna switch selection module 23 and two secondary signal receive links. In this embodiment, the number of the secondary signal receive link is two, but it is not limited to two, it may be three or more.

Each secondary signal receive links includes a secondary low noise amplifier 21 and a multi-band secondary filter 22. Similarly, the multi-band secondary filter 22 may be used to support the filtering of multiple frequency bands, such as N77 and N79 frequency bands. The multi-band secondary filter 22 is also a band-pass filter with a bandwidth of 3.3 GHz to 5.0 GHz.

In this embodiment, the primary low noise amplifier 111 and secondary low noise amplifier 21 refer to amplifiers with low noise figure. In the case of amplifying weak signals, the noise of the amplifier itself may interfere with the signals seriously, therefore it is desired to reduce the noise of the amplifier itself to improve the signal-to-noise ratio of output. Low noise amplifier is well known to those skilled in the art, which can further amplify the received RF signal and output it.

The secondary antenna switch selection module 23 is used for connecting and gating a secondary antenna or a primary RF front-end module 1, and is used for receiving RF signal of the primary antenna or the secondary antenna, or transmitting the RF signal received by the secondary antenna to the primary RF front-end module 1; the multi-band secondary filter 22 is used for filtering the RF signal received by the secondary antenna switch selection module 23 and then transmitting it to the secondary low noise amplifier 21; the secondary low noise amplifier 21 is used for receiving the RF signal transmitted from the multi-band secondary filter 22, amplifying it and outputting it to the RF transceiver module 5, and the secondary low noise amplifier 21 supports amplification of multi-band signals.

In this embodiment, as shown in FIGS. 3-5, the primary antenna switch selection module 13 includes a primary switch circuit, a plurality of primary antenna ports, a plurality of peripheral ports and a plurality of primary transceiver ports;

the primary switch circuit is used for connecting and gating the primary antenna port and the primary transceiver port or the peripheral port; the primary switch circuit is internally provided with a plurality of switches to realize gating between the primary antenna port and the primary transceiver port, or between the primary antenna port and the peripheral port.

The primary transceiver port is connected with the multi-band primary filter 14 of the main signal transceiver link. In this embodiment, there are at least two primary transceiver ports, which are called the first primary transceiver port RT11 and the second primary transceiver port RT12 respectively. They are used to connect the first primary signal transceiver link and the second primary signal transceiver link respectively, specifically to the first primary filter 14a of the first primary signal transceiver link and the second primary filter 14b of the second primary signal transceiver link (described in further detail later). Certainly, the primary transceiver port may be further added, it is not limited to only two primary transceiver ports.

The primary antenna port is used to connect the primary antenna or the secondary antenna switch selection module 23 of the secondary RF front-end module 2, so as to selectively connect the primary antenna or the secondary antenna to the two primary signal receive links. In this embodiment, the number of the primary antenna port is preferably 3, specifically the first primary antenna port T11, second primary antenna port T12 and third primary antenna port T13 shown in the figures. The 3 primary antenna ports are used to connect the primary antenna or the secondary RF front-end module (specifically connected to the secondary antenna switch selection module 23, and is connected to the secondary antenna via the secondary antenna switch selection module 23), wherein the first primary antenna port T11 is connected to the first primary antenna 31, the second primary antenna port T12 is connected to the second primary antenna 32, and the third primary antenna port T13 is connected to one of the ports (described later, marked as first secondary transceiver port RT21) of the secondary antenna switch selection module 23, the port may be selectively connected to the first secondary antenna 33 or the second secondary antenna 34 through the secondary antenna switch selection module 23; that is, it is extensively connected to the first secondary antenna 33 or the second secondary antenna 34 through the third primary antenna port T13. Therefore, the primary RF front-end module 1 can not only receive and transmit RF signals through the first primary antenna 31 and second primary antenna 32, but also expand to receive and transmit RF signals through the first secondary antenna 33 or second secondary antenna 34. In this embodiment, as shown in FIG. 5, the fourth primary antenna port T14 and the fifth primary antenna port T15 are reserved for later expansion and connection of antennas or connection of other RF front-end modules.

The peripheral port is used for connecting to the secondary RF front-end module 2, connecting the primary antenna to the secondary antenna switch selection module 23 of the secondary RF front-end module 2, and transmitting the signal received by the primary antenna to the two secondary signal receive links. In this embodiment, the peripheral port may be 1. For example, it may be first peripheral port AUX1, and the first peripheral port AUX1 is internally connected with the first primary switch or second primary switch through the switch selection of the primary switch circuit. The first peripheral port AUX1 is externally connected to the third secondary antenna port T23 of the secondary RF front-end module 2. In the secondary RF front-end module 2, the third secondary antenna port T23 and the first secondary signal receive link or the second secondary signal receive link may be gated by a secondary switch circuit (described in detail later). In this way, it can transmit the signals of the first primary antenna 31 or the second primary antenna 32 to the secondary RF front-end module 2 through the peripheral port for reception. In this embodiment, the second peripheral port AUX2 and the third peripheral port aux 3 are further provided, so as to further connect with other RF front-end modules.

The secondary antenna switch selection module 23 includes a secondary switch circuit, a plurality of secondary receive ports, a plurality of secondary antenna ports and a plurality of secondary transceiver ports. In this embodiment, there are three secondary antenna ports, namely, first secondary antenna port T21, second secondary antenna port T22 and third secondary antenna port T23. The first secondary antenna port T21 is used to connect the first secondary antenna 33; the second secondary antenna port T22 is used to connect the second secondary antenna 34. The third secondary antenna port T23 is used to connect the above first peripheral port AUX1, such that the secondary receive port can be connected to the first secondary antenna 33 or second secondary antenna 34 respectively, or connected to the first primary antenna 31 or second primary antenna 32 through the third secondary antenna port T23.

The secondary switch circuit is used for gating the secondary antenna port and the secondary receive port or the secondary transceiver port. That is, the secondary antenna port may be gated to the secondary receive port, or the secondary antenna port may be gated to the above secondary transceiver port;

the secondary receive port is connected with the multi-band secondary filter 22 of the secondary signal receive link, and is used to connect the secondary antenna or the primary antenna switch selection module 13 of the primary RF front-end module 1, so as to selectively connect the secondary antenna or the primary antenna to the two secondary signal receive links. In this embodiment, the secondary receive port includes a first secondary receive port R21 and a second secondary receive port R22. The first secondary receive port R21 and second secondary receive port R22 gate the first secondary antenna port T21, second secondary antenna port T22 or third secondary antenna port T23 through the internal secondary switch circuit.

The secondary transceiver port is used to connect to the primary RF front-end module 1, connect the secondary antenna to the primary antenna switch selection module 13 of the primary RF front-end module 1, and connect the secondary antenna to the two primary signal receive links. In this embodiment, the secondary transceiver port is designed to connect the primary RF front-end module 1, so that the primary RF front-end module 1 can connect and use the first secondary antenna 33 and second secondary antenna 34. There is one secondary transceiver port provided in this embodiment, i.e., first secondary transceiver port RT21. As a preferred solution, a secondary transceiver port may be added for standby, i.e., second secondary transceiver port RT22.

In this embodiment, as a preferred solution, the modulated RF signal is amplified to sufficient power with the power amplifier 112, and then transmitted by antenna via the matching network 113. Therefore, a matching network 113 is connected in series between the power amplifier 112 and the RF transceiver switch 12. The matching network 113 is used to perform impedance matching on the amplified RF signal and output it to the RF transceiver switch 12. The matching network 113 is known to the public, used to meet the specific matching relationship between the load impedance and the internal impedance of source during signal transmission. A certain relationship between the output impedance of a device and the impedance of the connected load should be satisfied, so as to avoid a significant effect on the working state of the device itself after the load is connected. Impedance matching is related to the overall performance of the system, and the performance of the system can be optimized by matching. The concept of impedance matching has a wide range of applications. Impedance matching is common among amplifier circuits of various stages, or between amplifier circuits and loads, between signals and transmission circuits, for the design of microwave circuits and systems, and active or passive, the matching problem must be considered. Those skilled in the art may obtain the content about matching network 113 without extra creative efforts. Thus it will not be introduced with details in this embodiment.

Specifically, as shown in FIG. 3, the two primary signal transceiver links include a first primary signal transceiver link and a second primary signal transceiver link;

the first primary signal transceiver link includes a first RF power amplifier module 11a, a first RF transceiver switch 12a and a first primary filter 14a;

the first RF power amplifier module 11a includes a first low noise amplifier 111a, a first power amplifier 112a and a first matching network 113a. A first matching network 113a is connected in series between the first power amplifier 112a and the first RF transceiver switch 12a. The first low noise amplifier 111a is used to receive the RF signal transmitted from the first RF transceiver switch 12a, amplify it and output it to the RF transceiver module 5. The first power amplifier 112a is used to receive the RF signal transmitted from the RF transceiver module 5, amplify it and output it to the first matching network 113a, and the first matching network 113a is used to perform impedance matching on the amplified RF signal and output it to the first RF transceiver switch 12a.

The first primary filter 14a is arranged between the primary antenna switch selection module 13 and the first RF transceiver switch 12a, used to filter the RF signal amplified by the first power amplifier 112a and transmit it to the primary antenna switch selection module 13, or filter the RF signal received from the primary antenna switch selection module 13 and transmit it to the first low noise amplifier 111a;

the second primary signal transceiver link includes a second RF power amplifier module 11b, a second RF transceiver switch 12b and a second primary filter 14b;

the second RF power amplifier module 11b includes a second low noise amplifier 111b, a second power amplifier 112b and a second matching network 113b. A second matching network 113b is connected in series between the second power amplifier 112b and the second RF transceiver switch 12b. The second low noise amplifier 111b is used to receive the RF signal transmitted from the second RF transceiver switch 12b, amplify it and output it to the RF transceiver module 5. The second power amplifier 112b is used to receive the RF signal transmitted from the RF transceiver module 5, amplify it and output it to the second matching network 113b, and the second matching network 113b is used to perform impedance matching on the amplified RF signal and output it to the second RF transceiver switch 12b.

The second primary filter 14b is arranged between the primary antenna switch selection module 13 and the second RF transceiver switch 12b, used to filter the RF signal amplified by the second power amplifier 112b and transmit it to the primary antenna switch selection module 13, or filter the RF signal received from the primary antenna switch selection module 13 and transmit it to the second low noise amplifier 111b;

the first low noise amplifier 111a and the second low noise amplifier 111b are multi-band amplifiers. For example, the first power amplifier 112a is a power amplifier supporting N77 or N79 frequency bands, and the second power amplifier 112b is a power amplifier supporting N79 or N77 frequency bands. The first low noise amplifier 111a and the first low noise amplifier 111a can both support the amplification of RF signals in N77 and N79 frequency bands;

the first primary filter 14a and the second primary filter 14b are band-pass filters supporting N77 and N79 frequency bands.

The primary RF front-end module 1 is provided with a first receive port RX1, a second receive port RX2, a first transmit port TX1 and a second transmit port TX2 for connecting to the RF transceiver module 5;

the first receive port RX1 is arranged at an output end of the first low noise amplifier 111*a*; the second receive port RX2 is arranged at an output end of the second low noise amplifier 111*b*; the first transmit port TX1 is arranged at an input end of the first power amplifier 112*a*; and the second transmit port TX2 is arranged at an input end of the second power amplifier 112*b*.

Specifically, as shown in FIGS. 3-5, the two secondary signal receive links include a first secondary signal receive link and a second secondary signal receive link;

the first secondary signal receive link includes a third low noise amplifier 211 and a first secondary filter 221;

the first secondary filter 221 is used to filter the RF signal received by the secondary antenna switch selection module 23 and then transmit it to the third low noise amplifier 211; the third low noise amplifier 211 is used to receive the RF signal transmitted from the first secondary filter 221, amplify it and output it to the RF transceiver module 5;

the second secondary signal receive link includes a fourth low noise amplifier 212 and a second secondary filter 222;

the second secondary filter 222 is used to filter the RF signal received by the secondary antenna switch selection module 23 and then transmit it to the fourth low noise amplifier 212; the fourth low noise amplifier 212 is used to receive the RF signal transmitted from the second secondary filter 222, amplify it and output it to the RF transceiver module 5.

In this embodiment, the first secondary filter 221 and the second secondary filter 222 are band-pass filters supporting N77 and N79 frequency bands; and the third low noise amplifier 211 and the fourth low noise amplifier 212 both support amplification of RF signals in N77 and N79 frequency bands.

Preferably, as shown in FIGS. 3-5, the secondary RF front-end module 2 further includes a port selection module 24; the port selection module 24 includes a built-in selection switch, a third receive port RX3 and a fourth receive port RX4;

the built-in selection switch is used to selectively connect the third receive port RX3, the fourth receive port RX4, the first secondary signal receive link and the second secondary signal receive link; and the third receive port RX3 and the fourth receive port RX4 are used to connect to the RF transceiver module 5.

As shown in FIGS. 3-5, in this embodiment, the first primary antenna 31 is connected to the first primary antenna port T11 through a first external duplexer 311; the second primary antenna 32 is connected to the second primary antenna port T12 through the second external duplexer 321;

the first secondary antenna 33 is connected to the first secondary antenna port T21 through the third external duplexer 331, and the second secondary antenna 34 is connected to the second secondary antenna port T22 through the fourth external duplexer 341.

a third primary antenna port T13 of the primary antenna switch selection module 13 is connected to one of the secondary transceiver ports (first secondary transceiver port RT21) on the secondary antenna switch selection module 23; one of the peripheral ports (first peripheral port AUX1) of the primary antenna switch selection module 13 is connected to a third secondary antenna port T23 of the secondary antenna switch selection module 23.

In this embodiment, the above first external duplexer 311, second external duplexer 321, third external duplexer 331 and fourth external duplexer 341 are known to the public. For example, they can be composed of two groups of band-stop filters in N77 frequency band or N79 frequency band. Its function is to isolate the transmit and receive signals, filter out interference, ensure that both receiving and transmitting can work normally at the same time, and void the transmission of the local transmission signal to the receiver.

In this embodiment, the above first primary antenna 31, second primary antenna 32, first secondary antenna 33 and second secondary antenna 34 are SRS (Sounding Reference Signal) antennas. The SRS antenna can be used to realize the switching of RF signals, SRS switching specifies the physical antenna on which the communication terminal 1000 sends the SRS information. Sending terminal SRS information is one of the ways for base station to detect terminal location and channel quality. The more antennas that can participate in transmitting the reference signal, the more accurate the channel estimation is, and thus the higher the rate is. If it is only transmitted with a fixed antenna, other antenna information would be lost, and the antenna would not be fully utilized, thus it is difficult to obtain the highest rate. The RF front-end architecture in this embodiment can transmit and receive signals in various frequency bands with four antennas.

For example, in this embodiment, the first power amplifier 112*a* in the first primary signal transceiver circuit in the above primary RF front-end module 1 implements the transmission of RF signals of N77 frequency band, and the second power amplifier 112*b* in the second primary signal transceiver circuit implements the transmission of RF signals of N79 frequency band. The above RF signal of N77 frequency band can be transmitted through the first matching network 113*a*, first RF transceiver switch 12*a* and first primary filter 14*a* in the first primary signal transceiver circuit, after passing through the primary antenna switch selection module 13, the first primary antenna 31, second primary antenna 32, first secondary antenna 33, or second secondary antenna 34 is selected to send out in turn. Similarly, the above RF signal of N79 frequency band can be transmitted through the second matching network 113*b*, second RF transceiver switch 12*b* and second primary filter 14*b* in the second primary signal transceiver circuit, after passing through the primary antenna switch selection module 13, the first primary antenna 31, second primary antenna 32, first secondary antenna 33, or second secondary antenna 34 is selected to send out in turn.

When receiving the RF signal, it can receive the RF signal through the first primary antenna 31 or second primary antenna 32 or first secondary antenna 33 or second secondary antenna 34, and then it can receive the RF signal via various links. At last, it is received into the RF transceiver module 5 via the first receive port RX1, second receive port RX2, third receive port RX3 and fourth receive port RX4.

Hereinafter, the working state of this application will be illustrated in detail with reference to the above drawings. By gating the signal links in the above primary RF front-end module 1 and secondary RF front-end module 2, the RF signals can be received or transmitted.

The receive path of RF signal is as follows:

1st receive path: the RF signal is received from the first primary antenna 31, enters from the first primary antenna port T11, the first primary transceiver port RT11 is gated through the primary switch circuit, and then the RF signal is filtered by the first primary filter 14*a*, transmitted to the first low noise amplifier 111*a* through the first RF transceiver switch 12*a*, amplified and output to the RF receive module from the first receive port RX1.

2nd receive path: the RF signal is received from the first primary antenna 31, enters from the first primary antenna port T11, the second primary transceiver port RT12 is gated through the primary switch circuit, and then the RF signal is filtered by the second primary filter 14b, transmitted to the second low noise amplifier 111b through the second RF transceiver switch 12b, amplified and output to the RF receive module from the second receive port RX2.

3rd receive path and 4th receive path: the RF signal is received from the first primary antenna 31, and after entering from the first primary antenna port T11, the first peripheral port AUX1 is gated by the primary switch circuit, then the first secondary receive port R21 is gated from the third secondary antenna port T23 through the secondary switch circuit, the RF signal is filtered by the first secondary filter 221, amplified by the third low noise amplifier 211, and output to the RF receive module from the third receive port RX3 or fourth receive port RX4.

5th receive path and 6th receive path: the RF signal is received from the first primary antenna 31, and after entering from the first primary antenna port T11, the first peripheral port AUX1 is gated by the primary switch circuit, then the second secondary receive port R22 is gated from the third secondary antenna port T23 through the secondary switch circuit, the RF signal is filtered by the second secondary filter 222, amplified by the fourth low noise amplifier 212, and output to the RF receive module from the third receive port RX3 or fourth receive port RX4.

7th receive path: the RF signal is received from the second primary antenna 32, enters from the second primary antenna port T12, the first primary transceiver port RT11 is gated through the primary switch circuit, and then the RF signal is filtered by the first primary filter 14a, transmitted to the first low noise amplifier 111a through the first RF transceiver switch 12a, amplified and output to the RF receive module from the first receive port RX1.

8th receive path: the RF signal is received from the second primary antenna 32, enters from the second primary antenna port T11, the second primary transceiver port RT12 is gated through the primary switch circuit, and then the RF signal is filtered by the second primary filter 14b, transmitted to the second low noise amplifier 111b through the second RF transceiver switch 12b, amplified and output to the RF receive module from the second receive port RX2.

9th receive path and 10th receive path: the RF signal is received from the first primary antenna 32, and after entering from the second primary antenna port T12, the first peripheral port AUX1 is gated by the primary switch circuit, then the first secondary receive port R21 is gated from the third secondary antenna port T23 through the secondary switch circuit, the RF signal is filtered by the first secondary filter 221, amplified by the third low noise amplifier 211, and output to the RF receive module from the third receive port RX3 or fourth receive port RX4.

11th receive path and 12th receive path: the RF signal is received from the second primary antenna 32, and after entering from the second primary antenna port T12, the first peripheral port AUX1 is gated by the primary switch circuit, then the second secondary receive port R22 is gated from the third secondary antenna port T23 through the secondary switch circuit, the RF signal is filtered by the first secondary filter 222, amplified by the fourth low noise amplifier 212, and output to the RF receive module from the third receive port RX4.

13rd receive path and 14th receive path: the RF signal is received from the first secondary antenna 33, and after entering from the first secondary antenna port T12, the first secondary receive port R21 is gated by the secondary switch circuit, then the RF signal is filtered by the first secondary filter 221, amplified by the third low noise amplifier 211, and output to the RF receive module from the third receive port RX3 or fourth receive port RX4.

15th receive path and 16th receive path: the RF signal is received from the first secondary antenna 33, and after entering from the first secondary antenna port T12, the second secondary receive port R22 is gated by the secondary switch circuit, then the RF signal is filtered by the second secondary filter 222, amplified by the fourth low noise amplifier 212, and output to the RF receive module from the third receive port RX3 or fourth receive port RX4.

17th receive path and 18th receive path: the RF signal is received from the second secondary antenna 34, and after entering from the second secondary antenna port T22, the first secondary receive port R21 is gated by the secondary switch circuit, then the RF signal is filtered by the first secondary filter 221, amplified by the third low noise amplifier 211, and output to the RF receive module from the third receive port RX3 or fourth receive port RX4.

19th receive path and 20th receive path: the RF signal is received from the second secondary antenna 34, and after entering from the second secondary antenna port T22, the second secondary receive port R22 is gated by the secondary switch circuit, then the RF signal is filtered by the second secondary filter 222, amplified by the fourth low noise amplifier 212, and output to the RF receive module from the third receive port RX3 or fourth receive port RX4.

21st receive path: the RF signal is received from the first primary antenna 33, enters from the first secondary antenna port T21, the first secondary transceiver port RT21 is gated through the secondary switch circuit, and then the RF signal enters the primary RF front-end module 1 from the third primary antenna port T13, the first primary transceiver port RT11 is gated through the primary switch circuit, and the RF signal is filtered by the first primary filter 14a, transmitted to the first low noise amplifier 111a through the first RF transceiver switch 12a, amplified and output to the RF receive module from the first receive port RX1.

22nd receive path: the RF signal is received from the first secondary antenna 33, enters from the first secondary antenna port T21, the first secondary transceiver port RT21 is gated through the secondary switch circuit, and then the RF signal enters the primary RF front-end module 1 from the third primary antenna port T13, the second primary transceiver port RT12 is gated through the primary switch circuit, and the RF signal is filtered by the second primary filter 14b, transmitted to the second low noise amplifier 111b through the second RF transceiver switch 12b, amplified and output to the RF receive module from the second receive port RX2.

23rd receive path: the RF signal is received from the second primary antenna 34, enters from the second secondary antenna port T22, the first secondary transceiver port RT21 is gated through the secondary switch circuit, and then the RF signal enters the primary RF front-end module 1 from the third primary antenna port T13, the first primary transceiver port RT11 is gated through the primary switch circuit, and the RF signal is filtered by the first primary filter 14a, transmitted to the first low noise amplifier 111a through the first RF transceiver switch 12a, amplified and output to the RF receive module from the first receive port RX1.

24th receive path: the RF signal is received from the second secondary antenna 34, enters from the second secondary antenna port T22, the first secondary transceiver port RT21 is gated through the secondary switch circuit, and then the RF signal enters the primary RF front-end module 1 from the third primary antenna port T13, the second primary transceiver port RT12 is gated through the primary switch circuit, and the RF signal is filtered by the second primary filter 14b, transmitted to the second low noise amplifier 111b through the second RF transceiver switch 12b, amplified and output to the RF receive module from the second receive port RX2.

The above receive paths show that each of the four antennas may be used as receive antenna of the RF signal, which can realize the reception of RF signal through multiple paths by the selection of the primary RF switch selection module, secondary RF switch selection module and RF transceiver switch. And finally, it is received into the RF transceiver module 5 from one of the first receive port RX1, second receive port RX2, third receive port RX3 and fourth receive port RX4.

The transmission path of RF signal is as follows:

1st transmission path: the RF signal of N77 frequency band transmitted by the RF transceiver module 5 enters the primary RF front-end module 1 through a first RF transmission port, and is amplified by the first power amplifier 112a, after impedance matching is performed by the first matching network 113a, the RF signal enters the first primary filter 14a through the first RF transceiver switch 12a for filtering, the first primary antenna port T11 is gated through the primary antenna switch, and the RF signal is transmitted from the first primary antenna 31.

2nd transmission path: the RF signal of N77 frequency band transmitted by the RF transceiver module 5 enters the primary RF front-end module 1 through the first RF transmission port, and is amplified by the first power amplifier 112a, after impedance matching is performed by the first matching network 113a, the RF signal enters the first primary filter 14a through the first RF transceiver switch 12a for filtering, the second primary antenna port T12 is gated through the primary antenna switch, and the RF signal is transmitted from the second primary antenna 32.

3rd transmission path: the RF signal of N77 frequency band transmitted by the RF transceiver module 5 enters the primary RF front-end module 1 through the first RF transmission port, and is amplified by the first power amplifier 112a, after impedance matching is performed by the first matching network 113a, the RF signal enters the first primary filter 14a through the first RF transceiver switch 12a for filtering, the third primary antenna port T13 is gated through the primary antenna switch, the RF signal enters the secondary RF front-end module 2 from the first secondary transceiver port RT21, the first secondary antenna port T21 is gated through the secondary switch circuit, and the RF signal is transmitted from the first secondary antenna 33.

4th transmission path: the RF signal of N77 frequency band transmitted by the RF transceiver module 5 enters the primary RF front-end module 1 through the first RF transmission port, and is amplified by the first power amplifier 112a, after impedance matching is performed by the first matching network 113a, the RF signal enters the first primary filter 14a through the first RF transceiver switch 12a for filtering, the third primary antenna port T13 is gated through the primary antenna switch, the RF signal enters the secondary RF front-end module 2 from the first secondary transceiver port RT21, the second secondary antenna port T22 is gated through the secondary switch circuit, and the RF signal is transmitted from the second secondary antenna 34.

The above four transmission paths can realize the switching of the RF signal of N77 frequency band in turn.

5th transmission path: the RF signal of N79 frequency band transmitted by the RF transceiver module 5 enters the primary RF front-end module 1 through a second RF transmission port, and is amplified by the second power amplifier 112b, after impedance matching is performed by the second matching network 113b, the RF signal enters the second primary filter 14b through the second RF transceiver switch 12b for filtering, the first primary antenna port T11 is gated through the primary antenna switch, and the RF signal is transmitted from the first primary antenna 31.

6th transmission path: the RF signal of N79 frequency band transmitted by the RF transceiver module 5 enters the primary RF front-end module 1 through the second RF transmission port, and is amplified by the second power amplifier 112b, after impedance matching is performed by the second matching network 113b, the RF signal enters the second primary filter 14b through the second RF transceiver switch 12b for filtering, the second primary antenna port T12 is gated through the primary antenna switch, and the RF signal is transmitted from the second primary antenna 32.

7th transmission path: the RF signal of N79 frequency band transmitted by the RF transceiver module 5 enters the primary RF front-end module 1 through the second RF transmission port, and is amplified by the second power amplifier 112b, after impedance matching is performed by the second matching network 113b, the RF signal enters the second primary filter 14b through the second RF transceiver switch 12b for filtering, the third primary antenna port T13 is gated through the primary antenna switch, the RF signal enters the secondary RF front-end module 2 from the first secondary transceiver port RT21, the first secondary antenna port T21 is gated through the secondary switch circuit, and the RF signal is transmitted from the first secondary antenna 33.

8th transmission path: the RF signal of N79 frequency band transmitted by the RF transceiver module 5 enters the primary RF front-end module 1 through the second RF transmission port, and is amplified by the second power amplifier 112b, after impedance matching is performed by the second matching network 113b, the RF signal enters the second primary filter 14b through the second RF transceiver switch 12b for filtering, the third primary antenna port T13 is gated through the primary antenna switch, the RF signal enters the secondary RF front-end module 2 from the first secondary transceiver port RT21, the second secondary antenna port T22 is gated through the secondary switch circuit, and the RF signal is transmitted from the second secondary antenna 34.

The above four transmission paths can realize the switching of the RF signal of N79 frequency band in turn.

To summarize, the above-described transmission paths show that each of the four antennas may be used as transmission antenna of the RF signal, and the RF signal is transmitted into the primary RF front-end module 1 through the above first transmit port TX1 or second transmit port TX2, and finally transmitted from the above four antennas after amplification, impedance matching and filtering.

The communication terminal 1000 provided by this embodiment optimizes the RF front-end architecture on the internal antenna device 100 by arranging the primary RF front-end module 1 and the secondary RF front-end module 2. In the primary RF front-end module 1, it can work in a multi-antenna mode through the two primary signal transceiver links and the primary antenna switch selection module. It can receive or transmit RF signals through the RF transceiver switch, and select to gate the relevant ports through the antenna switch selection module, so as to gate and connect the primary antenna link, and to gate and connect the secondary antenna link through the secondary RF front-end module 2, thus realizing the selection of multiple antenna links, and the RF signal of each antenna link is selectable. Meanwhile, the secondary antenna link is gated and connected through the two secondary signal receive links in the secondary RF front-end module 2 and the secondary antenna switch selection module 23, the primary antenna link is gated and connected through the primary RF front-end module 1, thus realizing the reception of multiple RF signals. The RF front-end architecture of this application is relatively simple in structure, only two RF front-end modules are needed to realize multiplex transmission and multiplex receiving of RF signals, and meanwhile, different frequency band signals which need to be accessed can be flexibly controlled and adjusted. Moreover, the low noise amplifiers in the RF front-end architecture all support the amplification of multi-band frequency signals, which can ensure the realization of 1T4R, 2T4R and other functions in fewer RF front-end modules, ensure the realization of rich function of the RF front-end architecture, and reduce the area of the RF front-end architecture.

The above are only the preferred embodiments of the present application, not intended to limit the present application. Any modification, equivalent substitution and improvement made within the spirit and principle of the present application shall be included in the protection scope of the present application.

What is claimed is:

1. An RF front-end architecture, comprising a primary RF front-end circuit and a secondary RF front-end circuit, wherein:

the primary RF front-end circuit comprises a primary antenna switch selection circuit and at least two primary signal transceiver links, the at least two primary signal transceiver links are connected with the primary antenna switch selection circuit;

each primary signal transceiver link comprises an RF power amplifier circuit, an RF transceiver switch and a multi-band primary filter arranged in sequence;

the RF power amplifier circuit comprises a primary low noise amplifier and a power amplifier, the power amplifier and the primary low noise amplifier are connected to the RF transceiver switch, the primary low noise amplifier is used for receiving RF signal transmitted from the RF transceiver switch, amplifying it and outputting it to the RF transceiver circuit, and the primary low noise amplifier supports amplification of multi-band signals, the power amplifier is used for receiving RF signal transmitted from the RF transceiver circuit, amplifying it and outputting it to the RF transceiver switch;

the RF transceiver switch is arranged between the RF power amplifier circuit and the multi-band primary filter, and used for switching connection between the multi-band primary filter and the primary low noise amplifier or the power amplifier, so as to selectively connect the multi-band primary filter to the primary low noise amplifier or the power amplifier;

the multi-band primary filter is arranged between the primary antenna switch selection circuit and the RF transceiver switch, and used for filtering the RF signal amplified by the power amplifier and transmitting it to the primary antenna switch selection circuit, or filtering the RF signal received from the primary antenna switch selection circuit and transmitting it to the primary low noise amplifier;

the primary antenna switch selection circuit is used for connecting and gating the two primary signal transceiver links and a primary antenna, or connecting and gating the two primary signal transceiver links and the secondary RF front-end circuit;

the secondary RF front-end circuit comprises a secondary antenna switch selection circuit and at least two secondary signal receive links;

each secondary signal receive link comprises a secondary low noise amplifier and a multi-band secondary filter; and the secondary antenna switch selection circuit is used for connecting and gating a secondary antenna or a primary RF front-end circuit, and is used for receiving RF signal of the primary antenna or the secondary antenna, or transmitting the RF signal received by the secondary antenna to the primary RF front-end circuit, the multi-band secondary filter is used for filtering the RF signal received by the secondary antenna switch selection circuit and then transmitting it to the secondary low noise amplifier, the secondary low noise amplifier is used for receiving the RF signal transmitted from the multi-band secondary filter, amplifying it and outputting it to the RF transceiver circuit, and the secondary low noise amplifier supports amplification of multi-band signals.

2. The RF front-end architecture of claim 1, wherein the primary antenna switch selection circuit comprises a primary switch circuit, a plurality of primary antenna ports, a plurality of peripheral ports and a plurality of primary transceiver ports; the primary switch circuit is used for connecting and gating the primary antenna port and the primary transceiver port or the peripheral port; the primary transceiver port is connected with the multi-band primary filter of the primary signal transceiver link, and the primary antenna port is used for connecting the primary antenna or the secondary antenna switch selection circuit of the secondary RF front-end circuit, so as to selectively connect the primary antenna or the secondary antenna to the two primary signal receive links; and the peripheral port is used for connecting to the secondary RF front-end circuit, connecting the primary antenna to the secondary antenna switch selection circuit of the secondary RF front-end circuit, and transmitting the signal received by the primary antenna to the two secondary signal receive links.

3. The RF front-end architecture of claim 2, wherein the secondary antenna switch selection circuit comprises a secondary switch circuit, a plurality of secondary receive ports, a secondary antenna port and a secondary transceiver port; the secondary switch circuit is used for gating the secondary antenna port and the secondary receive port or the secondary transceiver port; the secondary receive port is connected with the multi-band secondary filter of the secondary signal receive link; the secondary antenna port is used for connecting the secondary antenna or the primary antenna switch selection circuit of the primary RF front-end circuit, so as to selectively connect the secondary antenna or the primary antenna to the two secondary signal receive links; and the secondary transceiver port is used for connecting to the primary RF front-end circuit, connecting the secondary antenna to the primary antenna switch selection circuit of the primary RF front-end circuit, and connecting the secondary antenna to the two primary signal receive links.

4. The RF front-end architecture of claim 1, wherein a matching network is connected in series between the power amplifier and the RF transceiver switch; and the power amplifier in the RF power amplifier circuit is used for receiving the RF signal transmitted from the RF transceiver circuit, amplifying it and outputting it to the matching network, and the matching network is used for performing impedance matching on the amplified RF signal and outputting it to the RF transceiver switch.

5. The RF front-end architecture of claim 4, wherein the at least two primary signal transceiver links comprise a first primary signal transceiver link and a second primary signal transceiver link; the first primary signal transceiver link comprises a first RF power amplifier circuit, a first RF transceiver switch and a first primary filter; the first RF power amplifier circuit comprises a first low noise amplifier, a first power amplifier and a first matching network; a first matching network is connected in series between the first power amplifier and the first RF transceiver switch; the first low noise amplifier is used for receiving the RF signal transmitted from the first RF transceiver switch, amplifying it and outputting it to the RF transceiver circuit; the first power amplifier is used for receiving the RF signal transmitted from the RF transceiver circuit, amplifying it and outputting it to the first matching network, and the first matching network is used for performing impedance matching on the amplified RF signal and outputting it to the first RF transceiver switch; the first primary filter is arranged between the primary antenna switch selection circuit and the first RF transceiver switch, and used for filtering the RF signal amplified by the first power amplifier and transmitting it to the primary antenna switch selection circuit, or filtering the RF signal received from the primary antenna switch selection circuit and transmitting it to the first low noise amplifier; the second primary signal transceiver link comprises a second RF power amplifier circuit, a second RF transceiver switch and a second primary filter; the second RF power amplifier circuit comprises a second low noise amplifier, a second power amplifier and a second matching network; a second matching network is connected in series between the second power amplifier and the second RF transceiver switch; the second low noise amplifier is used for receiving the RF signal transmitted from the second RF transceiver switch, amplifying it and outputting it to the RF transceiver circuit; the second power amplifier is used for receiving the RF signal transmitted from the RF transceiver circuit, amplifying it and outputting it to the second matching network, and the second matching network is used for performing impedance matching on the amplified RF signal and outputting it to the second RF transceiver switch; and the second primary filter is arranged between the primary antenna switch selection circuit and the second RF transceiver switch, and used for filtering the RF signal amplified by the second power amplifier and transmitting it to the primary antenna switch selection circuit, or filtering the RF signal received from the primary antenna switch selection circuit and transmitting it to the second low noise amplifier.

6. The RF front-end architecture of claim 5, wherein the first power amplifier is a power amplifier supporting N77 or N79 frequency band, and the second power amplifier is a power amplifier supporting N79 or N77 frequency band; the first low noise amplifier and the second low noise amplifier both support amplification of RF signals in N77 and N79 frequency bands; and the first primary filter and the second primary filter are band-pass filters supporting N77 and N79 frequency bands.

7. The RF front-end architecture of claim 5, wherein the primary RF front-end circuit is provided with a first receive port, a second receive port, a first transmit port and a second transmit port for connecting to the RF transceiver circuit; and the first receive port is arranged at an output end of the first low noise amplifier; the second receive port is arranged at an output end of the second low noise amplifier; the first transmit port is arranged at an input end of the first power amplifier; and the second transmit port is arranged at an input end of the second power amplifier.

8. The RF front-end architecture of claim 1, wherein the at least two secondary signal receive links comprise a first secondary signal receive link and a second secondary signal receive link; the first secondary signal receive link comprises a third low noise amplifier and a first secondary filter; the first secondary filter is used for filtering the RF signal received by the secondary antenna switch selection circuit and then transmitting it to the third low noise amplifier; and the third low noise amplifier is used for receiving the RF signal transmitted from the first secondary filter, amplifying it and outputting it to the RF transceiver circuit; the second secondary signal receive link comprises a fourth low noise amplifier and a second secondary filter; and the second secondary filter is used for filtering the RF signal received by the secondary antenna switch selection circuit and then transmitting it to the fourth low noise amplifier; and the fourth low noise amplifier is used for receiving the RF signal transmitted from the second secondary filter, amplifying it and outputting it to the RF transceiver circuit.

9. The RF front-end architecture of claim 8, wherein the first secondary filter and the second secondary filter are band-pass filters supporting N77 and N79 frequency bands; and the third low noise amplifier and the fourth low noise amplifier both support amplification of RF signals in N77 and N79 frequency bands.

10. The RF front-end architecture of claim 8, wherein the secondary RF front-end circuit further comprises a port selection circuit; the port selection circuit comprises a built-in selection switch, a third receive port and a fourth receive port; the built-in selection switch is used for selectively connecting the third receive port, the fourth receive port, the first secondary signal receive link and the second secondary signal receive link; and the third receive port and the fourth receive port are used for connecting to the RF transceiver circuit.

11. An antenna device, comprising a baseband circuit, an RF transceiver circuit, an RF front-end architecture and an antenna link circuit; wherein the RF front-end architecture comprises a primary RF front-end circuit and a secondary RF front-end; circuit, wherein:

the primary RF front-end circuit comprises a primary antenna switch selection circuit and at least two primary signal transceiver links, the at least two primary signal transceiver links are connected with the primary antenna switch selection circuit;

each primary signal transceiver link comprises an RF power amplifier circuit, an RF transceiver switch and a multi-band primary filter arranged in sequence;

the RF power amplifier circuit comprises a primary low noise amplifier and a power amplifier, the power amplifier and the primary low noise amplifier are connected to the RF transceiver switch, the primary low noise amplifier is used for receiving RF signal transmitted from the RF transceiver switch, amplifying it and outputting it to the RF transceiver circuit, and the primary low noise amplifier supports amplification of multi-band signals, the power amplifier is used for receiving RF signal transmitted from the RF transceiver circuit, amplifying it and outputting it to the RF transceiver switch;

the RF transceiver switch is arranged between the RF power amplifier circuit and the multi-band primary filter, and used for switching connection between the multi-band primary filter and the primary low noise amplifier or the power amplifier, so as to selectively connect the multi-band primary filter to the primary low noise amplifier or the power amplifier;

the multi-band primary filter is arranged between the primary antenna switch selection circuit and the RF transceiver switch, and used for filtering the RF signal amplified by the power amplifier and transmitting it to the primary antenna switch selection circuit, or filtering the RF signal received from the primary antenna switch selection circuit and transmitting it to the primary low noise amplifier;

the primary antenna switch selection circuit is used for connecting and gating the two primary signal transceiver links and a primary antenna, or connecting and gating the two primary signal transceiver links and the secondary RF front-end circuit;

the secondary RF front-end circuit comprises a secondary antenna switch selection circuit and at least two secondary signal receive links;

each secondary signal receive link comprises a secondary low noise amplifier and a multi-band secondary filter; and the secondary antenna switch selection circuit is used for connecting and gating a secondary antenna or a primary RF front-end circuit, and is used for receiving RF signal of the primary antenna or the secondary antenna, or transmitting the RF signal received by the secondary antenna to the primary RF front-end circuit, the multi-band secondary filter is used for filtering the RF signal received by the secondary antenna switch selection circuit and then transmitting it to the secondary low noise amplifier, the secondary low noise amplifier is used for receiving the RF signal transmitted from the multi-band secondary filter, amplifying it and outputting it to the RF transceiver circuit, and the secondary low noise amplifier supports amplification of multi-band signals.

12. The antenna device of claim 11, wherein the primary antenna switch selection circuit comprises a primary switch circuit, a plurality of primary antenna ports, a plurality of peripheral ports and a plurality of primary transceiver ports; the primary switch circuit is used for connecting and gating the primary antenna port and the primary transceiver port or the peripheral port; the primary transceiver port is connected with the multi-band primary filter of the primary signal transceiver link; the primary antenna port is used for connecting the primary antenna or the secondary antenna switch selection circuit of the secondary RF front-end circuit, so as to selectively connect the primary antenna or the secondary antenna to the two primary signal receive links; and the peripheral port is used for connecting to the secondary RF front-end circuit, connecting the primary antenna to the secondary antenna switch selection circuit of the secondary RF front-end circuit, and transmitting the signal received by the primary antenna to the two secondary signal receive links.

13. The antenna device of claim 12, wherein the secondary antenna switch selection circuit comprises a secondary switch circuit, a plurality of secondary receive ports, a secondary antenna port and a secondary transceiver port; the secondary switch circuit is used for gating the secondary antenna port and the secondary receive port or the secondary transceiver port; the secondary receive port is connected with the multi-band secondary filter of the secondary signal receive link; the secondary antenna port is used for connecting the secondary antenna or the primary antenna switch selection circuit of the primary RF front-end module circuit, so as to selectively connect the secondary antenna or the primary antenna to the two secondary signal receive links; and the secondary transceiver port is used for connecting to the primary RF front-end circuit, connecting the secondary antenna to the primary RF front-end circuit, and connecting the secondary antenna to the two primary signal receive links.

14. The antenna device of claim 11, wherein a matching network is connected in series between the power amplifier and the RF transceiver switch; and the power amplifier in the RF power amplifier circuit is used for receiving the RF signal transmitted from the RF transceiver circuit, amplifying it and outputting it to the matching network, and the matching network is used for performing impedance matching on the amplified RF signal and outputting it to the RF transceiver switch.

15. The antenna device of claim 11, wherein the antenna link circuit comprises a primary antenna link and a secondary antenna link; the primary antenna link comprises a first primary antenna and a second primary antenna; the first primary antenna is connected to the first primary antenna port; the second primary antenna is connected to the second primary antenna port; the secondary antenna link comprises a first secondary antenna and a second secondary antenna; the first secondary antenna is connected to the first secondary antenna port; the second secondary antenna is connected to the second secondary antenna port; and a third primary antenna port of the primary antenna switch selection circuit is connected to one of the secondary transceiver ports on the secondary antenna switch selection circuit; one of the peripheral ports of the primary antenna switch selection circuit is connected to a third secondary antenna port of the secondary antenna switch selection circuit.

16. A communication terminal, comprising an antenna device; the antenna device comprises a baseband circuit, an RF transceiver circuit, an RF front-end architecture and an antenna link circuit; wherein the RF front-end architecture comprises a primary RF front-end circuit and a secondary RF front-end circuit, wherein:

the primary RF front-end circuit comprises a primary antenna switch selection circuit and at least two primary signal transceiver links, the at least two primary signal transceiver links are connected with the primary antenna switch selection circuit;

each primary signal transceiver link comprises an RF power amplifier circuit, an RF transceiver switch and a multi-band primary filter arranged in sequence;

the RF power amplifier circuit comprises a primary low noise amplifier and a power amplifier, the power amplifier and the primary low noise amplifier are connected to the RF transceiver switch, the primary low noise amplifier is used for receiving RF signal transmitted from the RF transceiver switch, amplifying it and outputting it to the RF transceiver circuit, and the primary low noise amplifier supports amplification of multi-band signals, the power amplifier is used for receiving RF signal transmitted from the RF transceiver circuit, amplifying it and outputting it to the RF transceiver switch;

the RF transceiver switch is arranged between the RF power amplifier circuit and the multi-band primary filter, and used for switching connection between the multi-band primary filter and the primary low noise amplifier or the power amplifier, so as to selectively connect the multi-band primary filter to the primary low noise amplifier or the power amplifier;

the multi-band primary filter is arranged between the primary antenna switch selection circuit and the RF transceiver switch, and used for filtering the RF signal amplified by the power amplifier and transmitting it to the primary antenna switch selection circuit, or filtering the RF signal received from the primary antenna switch selection circuit and transmitting it to the primary low noise amplifier;

the primary antenna switch selection circuit is used for connecting and gating the two primary signal transceiver links and a primary antenna, or connecting and gating the two primary signal transceiver links and the secondary RF front-end circuit;

the secondary RF front-end circuit comprises a secondary antenna switch selection circuit and at least two secondary signal receive links;

each secondary signal receive link comprises a secondary low noise amplifier and a multi-band secondary filter; and the secondary antenna switch selection circuit is used for connecting and gating a secondary antenna or a primary RF front-end circuit, and is used for receiving RF signal of the primary antenna or the secondary antenna, or transmitting the RF signal received by the secondary antenna to the primary RF front-end circuit, the multi-band secondary filter is used for filtering the RF signal received by the secondary antenna switch selection circuit and then transmitting it to the secondary low noise amplifier, the secondary low noise amplifier is used for receiving the RF signal transmitted from the multi-band secondary filter, amplifying it and outputting it to the RF transceiver circuit, and the secondary low noise amplifier supports amplification of multi-band signals.

17. The communication terminal of claim 16, wherein the primary antenna switch selection circuit comprises a primary switch circuit, a plurality of primary antenna ports, a plurality of peripheral ports and a plurality of primary transceiver ports; the primary switch circuit is used for connecting and gating the primary antenna port and the primary transceiver port or the peripheral port; the primary transceiver port is connected with the multi-band primary filter of the primary signal transceiver link; the primary antenna port is used for connecting the primary antenna or the secondary antenna switch selection circuit of the secondary RF front-end circuit, so as to selectively connect the primary antenna or the secondary antenna to the two primary signal receive links; and the peripheral port is used for connecting to the secondary RF front-end circuit, connecting the primary antenna to the secondary antenna switch selection circuit of the secondary RF front-end circuit, and transmitting the signal received by the primary antenna to the two secondary signal receive links.

18. The communication terminal of claim 17, wherein the secondary antenna switch selection circuit comprises a secondary switch circuit, a plurality of secondary receive ports, a secondary antenna port and a secondary transceiver port; the secondary switch circuit is used for gating the secondary antenna port and the secondary receive port or the secondary transceiver port; the secondary receive port is connected with the multi-band secondary filter of the secondary signal receive link; the secondary antenna port is used for connecting the secondary antenna or the primary antenna switch selection circuit of the primary RF front-end circuit, so as to selectively connect the secondary antenna or the primary antenna to the two secondary signal receive links; and the secondary transceiver port is used for connecting to the primary RF front-end circuit, connecting the secondary antenna to the primary antenna switch selection circuit of the primary RF front-end circuit, and connecting the secondary antenna to the two primary signal receive links.

19. The communication terminal of claim 16, wherein a matching network is connected in series between the power amplifier and the RF transceiver switch; and the power amplifier in the RF power amplifier circuit is used for receiving the RF signal transmitted from the RF transceiver circuit, amplifying it and outputting it to the matching network, and the matching network is used for performing impedance matching on the amplified RF signal and outputting it to the RF transceiver switch.

20. The communication terminal of claim 16, wherein the antenna link circuit comprises a primary antenna link and a secondary antenna link; the primary antenna link comprises a first primary antenna and a second primary antenna; the first primary antenna is connected to the first primary antenna port; the second primary antenna is connected to the second primary antenna port; the secondary antenna link comprises a first secondary antenna and a second secondary antenna; the first secondary antenna is connected to the first secondary antenna port; the second secondary antenna is connected to the second secondary antenna port; and a third primary antenna port of the primary antenna switch selection circuit is connected to one of the secondary transceiver ports on the secondary antenna switch selection circuit; one of the peripheral ports of the primary antenna switch selection circuit is connected to a third secondary antenna port of the secondary antenna switch selection circuit.

* * * * *